United States Patent
Ali et al.

(10) Patent No.: US 7,218,710 B1
(45) Date of Patent: May 15, 2007

(54) SEPARATELY SECURED VOICE MESSAGES

(75) Inventors: Syed S. Ali, Allentown, PA (US); Said O. Belhaj, Coplay, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/314,966

(22) Filed: May 20, 1999

(51) Int. Cl.
*H04M 1/64* (2006.01)
(52) U.S. Cl. ............... 379/88.23; 379/88.21; 379/142.06
(58) Field of Classification Search ........... 379/67.1, 379/68, 88.22, 88.23, 88.24, 142.04, 142.06, 379/142.05, 88.25, 88.27
See application file for complete search history.

(56) References Cited

U.S. PATENT DOCUMENTS

| | | | | |
|---|---|---|---|---|
| 4,122,306 A | * | 10/1978 | Friedman et al. .............. 379/73 |
| 5,400,393 A | * | 3/1995 | Knuth et al. .............. 379/88.27 |
| 5,440,616 A | * | 8/1995 | Harrington et al. .......... 370/428 |
| 5,559,860 A | * | 9/1996 | Mizikovsky ................ 455/413 |
| 5,604,791 A | * | 2/1997 | Lee ......................... 379/142.06 |
| 5,825,865 A | * | 10/1998 | Oberlander et al. ... 379/211.02 |
| 5,963,626 A | * | 10/1999 | Nabkel .................... 379/142.01 |
| 5,966,351 A | * | 10/1999 | Carleton et al. .......... 369/29.01 |
| 6,215,860 B1 | * | 4/2001 | Johanson et al. ......... 379/88.13 |
| 6,229,878 B1 | * | 5/2001 | Moganti ................. 379/100.06 |
| 6,335,962 B1 | * | 1/2002 | Ali et al. .................... 379/67.1 |
| 6,359,970 B1 | * | 3/2002 | Burgess ...................... 379/67.1 |

* cited by examiner

*Primary Examiner*—Fan Tsang
*Assistant Examiner*—Simon Sing (57) ABSTRACT

Apparatus and processes to allow voice messages to be individually and/or separately secured by a caller for playback only by an intended person or persons. The voice messages are separately secured with security information contained in a header associated with each voice message. The caller may be authorized to secure a voice message either by inputting a pre-determined authorization security code using their keypad, or based on call related information received with respect to the incoming call. The user, upon attempt to access a separately secured voice message, is prompted for input of an appropriate authorized security code to allow the access to proceed. Without proper access, a user is allowed to access (e.g., playback, delete, etc.) only non-secured voice messages.

20 Claims, 8 Drawing Sheets

SEPARATELY SECURED VOICE MESSAGES

BACKGROUND OF THE INVENTION

1. Field of the Invention

This invention relates generally to voice messaging systems. More particularly, it relates to a telephone answering device capable of receiving and storing separately secured voice messages from a calling party and of allowing a particular user or other designated party to access the separately secured voice messages.

2. Background of Related Art

Voice messaging systems in general, and telephone answering devices (i.e., answering machines) in particular, are useful devices for the home or office. For instance, a conventional telephone answering device operates on a single telephone line and answers an incoming call to an unused (i.e., on-hook) telephone after a desired number of rings. In response to an incoming call, a telephone answering device causes a telephone line to enter an off-hook condition, then plays an outgoing greeting message to the calling party. After the outgoing greeting message, the calling party typically may leave a voice message on the telephone answering device. At a later time, the voice message is replayed by the user, either local to the telephone answering device or via remote connection from another telephone.

Figure 7:
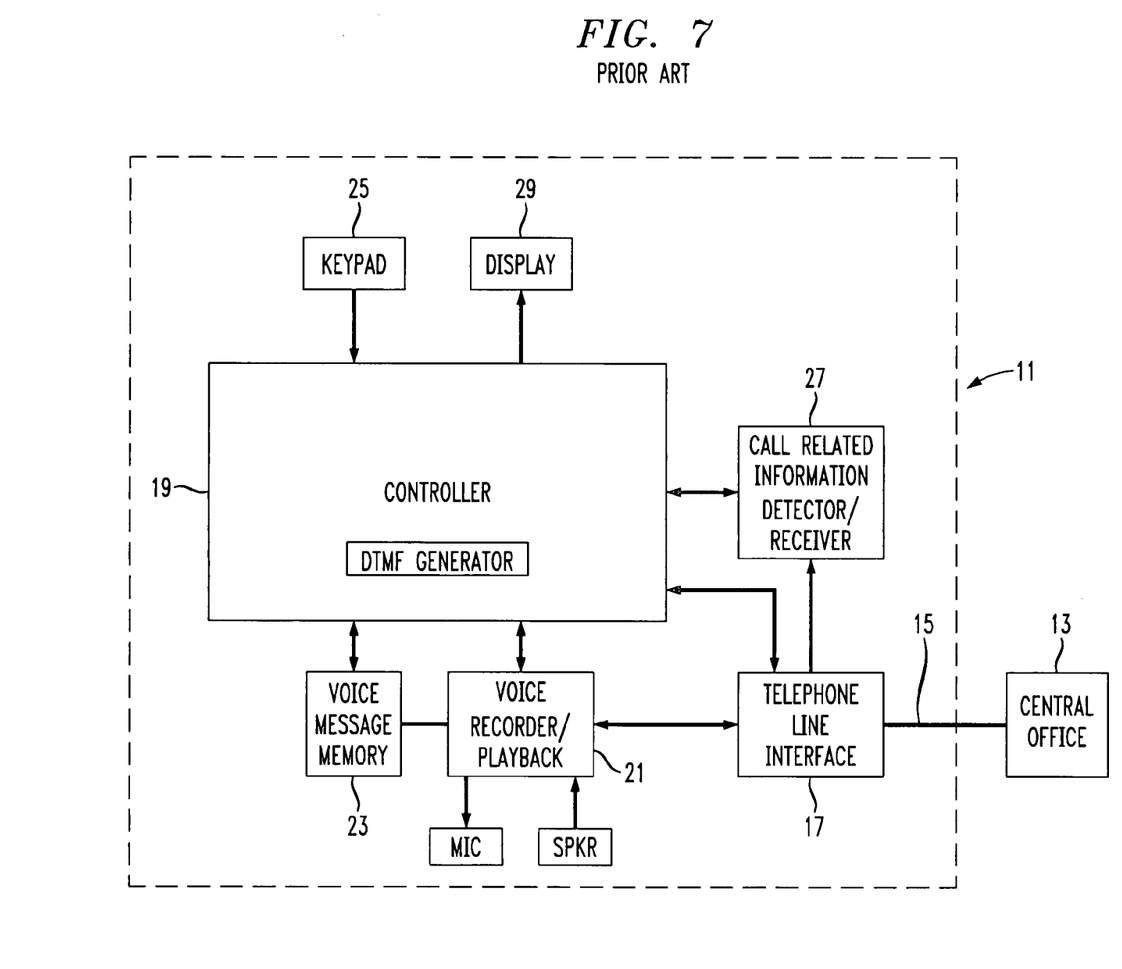
FIG. 7 illustrates a conventional telephone answering device allowing any user of a voice messaging system to access any or all stored voice messages received over a particular telephone line.

FIG. 7 illustrates a conventional telephone answering device capable of answering an incoming call on a telephone line. In FIG. 7, a telephone answering device 11 is connected to a telephone company central office 13 via a telephone line 15. A telephone line interface (TLI) 17 in the telephone answering device 11 provides the conventional isolation, DC and AC impedance as required by telephone company standards. The telephone line interface 17 also provides a ring detect signal to a controller 19. The controller 19 may be any suitable processor, e.g., microprocessor, microcontroller, or digital signal processor (DSP). The ring detect signal indicates to the controller 19 the ringing of an incoming telephone call on the telephone line 15.

After a desired number of ring signals, the telephone answering device 11 causes the telephone line interface 17 to place the telephone line in an off-hook state, and instructs a voice recorder/playback audio module 21 to play an outgoing greeting message over the telephone line 15 to the calling party. Upon completion of the outgoing greeting message, the calling party may leave a voice message in voice message memory 23 under the control of the controller 19. A keypad 25 allows the user to select various modes of operation, including the playback of voice messages.

The conventional telephone answering device 11 illustrated in FIG. 7 further includes a call related information (e.g., Calling Identity Delivery (Caller ID)) detector/receiver 27 to detect and receive from a central office call related information, e.g., the telephone number and/or household name of a calling party. The call related information may be displayed on a display 29.

By using Caller ID or other call related information data service, the user of the conventional telephone answering device 11 can determine the name and/or telephone number of the calling party either before the incoming call is answered, and/or when an associated voice message is played back. Basic call related information services such as Caller ID typically transmit call related information from the local telephone company to the called party while the called party's phone is in a hung-up or on-hook state, e.g., between the first and second rings.

Oftentimes, it is important or necessary for the calling party to leave a private voice message for a particular user of a voice messaging system or other designated party. Conventional voice messaging systems provide separate voice mailboxes, typically each at a different extension. The calling party inputs a particular extension number relating to a particular voice mailbox, and is given the opportunity to record a voice message for storage in the designated voice mailbox.

However, in conventional voice messaging systems, all messages left in any one particular voice mailbox are accessible by all users of that particular voice mailbox. Unfortunately, a conventional multi-user voice messaging system does not prevent an otherwise unauthorized user to playback and listen to any particular voice message in any one voice mailbox.

Accordingly, there exists a need for a telephone answering device which prevents unauthorized playback of private voice messages.

SUMMARY OF THE INVENTION

In accordance with the principles of the present invention, a voice messaging system comprises a telephone line interface, a controller, and voice message memory adapted to store a plurality of voice messages. A secured message authorization module is adapted to allow a calling party to separately secure a voice message for access only by an authorized user.

A method for securing a voice message on a voice messaging system in accordance with another aspect of the present invention comprises prompting a calling party to enter an authorized security code. An entered authorized security code is compared to at least one pre-stored authorized security code accessible by the voice messaging system. Upon matching the entered authorized security code with the at least one pre-stored authorized security code, a recorded voice message is secured.

A method for accessing a secured voice message on a voice messaging system in accordance with yet another aspect of the present invention comprises prompting a user of the voice messaging system to enter an authorized security code on a voice message-by-voice message basis for secured voice messages. An entered authorized security code is compared to at least one pre-stored authorized security code accessible by the voice messaging system. Upon matching the entered authorized security code with the at least one pre-stored authorized security code, the user is allowed access to an underlying secured voice message.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a voice messaging system and method for allowing a calling party to separately secure a recorded private voice message. The present invention further allows the intended (i.e., authorized) user of the voice messaging system or other designated party to access the separately secured/private voice message. The calling party may manually secure the secured/private voice message either by inputting a pre-authorized security code, or may rely on an automatic securing capability provided by the called voice messaging system using call related information (e.g., Caller ID information) matched to an entry in a pre-arranged authorized security code table maintained in the voice messaging system. The user or other designated party intended by the caller to have playback/delete access to the separately secured voice message is provided access to the separately secured voice message upon entry of a pre-assigned user authorization security code.

If the calling party does not enter a proper pre-assigned (i.e., authorized) caller authorized security code, and/or if the call related information received by the voice messaging system with respect to the incoming call is not matched to an entry in an authorized security code table, then the calling party is allowed to record a non-secured voice message on the voice messaging system in an otherwise conventional fashion, i.e., for playback by all users of the voice mailbox of the voice messaging system.

If, on the other hand, the user or other designated party operating the voice mailbox of the voice messaging system does not enter a pre-assigned user authorization security code when encountering a separately secured recorded voice message, then that user or other designated party is allowed access (e.g., to playback and/or to delete) only to non-secured voice messages.

For instance, if a calling party attempts to place a telephone call to an unanswered telephone, after a predetermined number of rings a telephone answering device automatically answers the call by placing the telephone line in an off-hook condition, and initiates the output of a suitable outgoing greeting message. Thereafter, in accordance with one embodiment of the present invention, the calling party is allowed to enter a pre-assigned caller's authorization security code as desired to 'secure' their voice message for access only by an authorized person.

The present invention is distinctive from the use of separate voice mailboxes in a voice messaging system because it does not allow access to all voice messages in any particular voice mailbox based on a group-based password. Instead, in accordance with the principles of the present invention, voice messages are individually and separately secured for access by any particular user of a voice messaging system, but may otherwise reside together with non-secured voice messages in a common voice mailbox and/or voice message memory of the voice messaging system.

Figure 1:
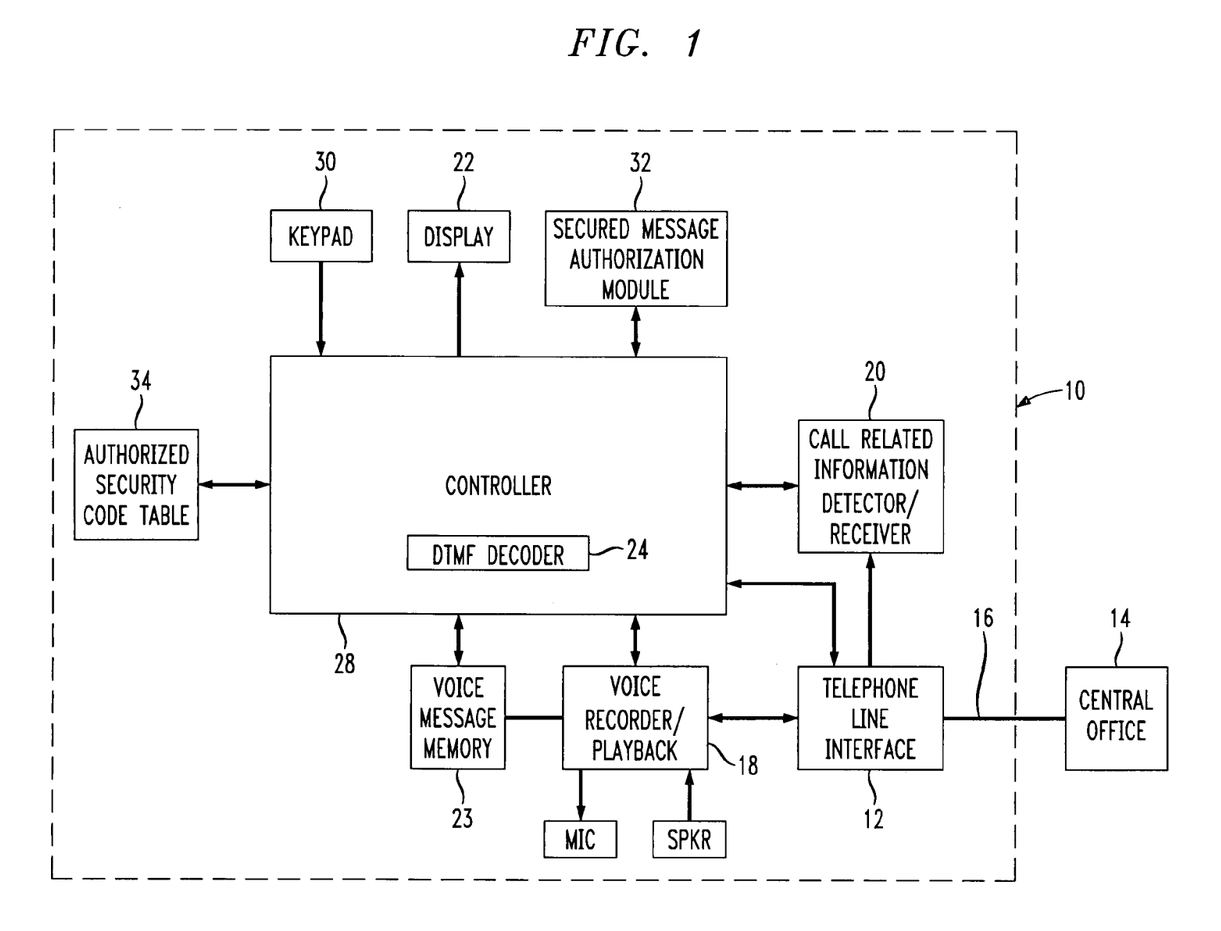
FIG. 1 illustrates a telephone answering device for allowing a user to record separately secured/private voice messages and allowing a particular user or other designated party to access the separately secured/private voice messages, in accordance with the principles of the present invention.

The particular security status of each individual voice message may be stored with TAG or other header information commonly associated with each stored voice message in voice message memory 23 (FIG. 1).

A plurality of security levels may be implemented as desired, allowing different users different levels of access to any one secured voice message. Thus, for instance, a security level of 2 or HIGH may allow access only to adults using a particular voice messaging system, whereas another security level of 1 or LOW may allow access to all users of that particular voice messaging system.

FIG. 1 illustrates an embodiment of a voice messaging system in accordance with the principles of the present invention. In particular, FIG. 1 shows a telephone answering device, indicated generally at 10, capable of recording a separately secured/private voice message from a calling party, and of allowing a user or other designated party to access the separately secured/private voice message with the entry of a pre-authorized security code into a keypad 30 or other information entry port of the telephone answering device 10.

In the embodiment of FIG. 1, the telephone answering device 10 includes at least one telephone line interface 12 for interconnection with a telephone company central office 14 via a telephone line 16. The telephone line interface 12 interconnects the telephone line 16 with an otherwise conventional voice recorder/playback module 18.

The telephone answering device 10 of the present invention further includes a dual tone, multiple frequency (DTMF) decoder 24 to allow detection of security codes input remotely by the calling party. Preferably, the security codes are comprised of alphanumeric digits consistent with those commonly associated with the 12 keys of an alphanumeric keypad commonly found on most touch tone telephones. The DTMF decoder 24 is shown internal to the controller 28, but may alternatively be separate from the controller 28 but nevertheless in communication with the controller 28.

To allow secured access to selected voice messages, the telephone answering device 10 illustrated in FIG. 1 further includes a secured message authorization module 32 and an associated authorized security code table 34.

The secured message authorization module 32 is preferably a software module included within the program code of the controller 28 which obtains a security code from a caller (or call related information), compares the code to a list of pre-authorized callers who may leave a separately secured voice message on the relevant telephone answering device 10, and directs the inclusion of security information with the header information relating to the associated voice message when stored in the voice message memory 23. Alternatively, the secured message authorization module 32 may be separate from the controller 28, but is preferably nevertheless in communication with the controller 28.

The disclosed embodiment preferably (but not necessarily) includes a call related information detector/receiver 20 to provide call related information such as Caller ID information to the controller 28. The telephone line interface 12 of the telephone answering device 10 interconnects the telephone line 16 with the call related information detector/receiver 20, which detects and receives available call related information regarding a calling party on the telephone line 16, e.g., a telephone number, area code, and/or household name associated with the incoming telephone call. The call related information may be displayed, e.g., on a display 22, and/or otherwise made generally available to the controller 28 for use in determining the desirability of establishing a secured status with an associated voice message stored in voice message memory 23.

The authorized security code table 34 is used by the secured message authorization module 32 to provide a pre-determined list of authorized callers capable of recording a voice message having secured status. The information in the authorized security code table 34 may be any sequence of alphanumeric characters, preferably associated with a standard 12-key alphanumeric keypad found on most touch tone telephones, but may alternatively or additionally include authorizing entries based on call related information (e.g., a telephone number and/or household name). The use of call related information provides the added convenience to the caller such that the caller need not manually input a security code. Thus, the call related information received by the called telephone answering device may be automatically detected and received by the call related information detector/receiver 20 and obtained by the secured message authorization module 32 for comparison with pre-authorized entries in the authorized security code table 34.

The authorized security code table 34 may also include one or more security codes relating not only to callers but also to users authorized to playback particularly secured voice messages. Alternatively, a separate table may be maintained by the user to allow the secured message authorization module 32 to authorize users as they request playback of any particular separately secured voice message.

The authorized security code table 34 in the exemplary embodiment includes a database associating specifically authorized security codes and/or call related information with a specific calling party. Alternatively, calling parties may share one or more specifically authorized security codes, depending on the desires and security needs of the user(s) of the telephone answering device 10.

Additional security access information may be gleaned from call related information received with respect to incoming telephone calls. For instance, a call information detector/receiver 20 may be included to automatically provide the telephone answering device with information sufficient to determine a pre-determined security level of an associated voice message from a simple look-up table established in the controller 28.

Figure 2:
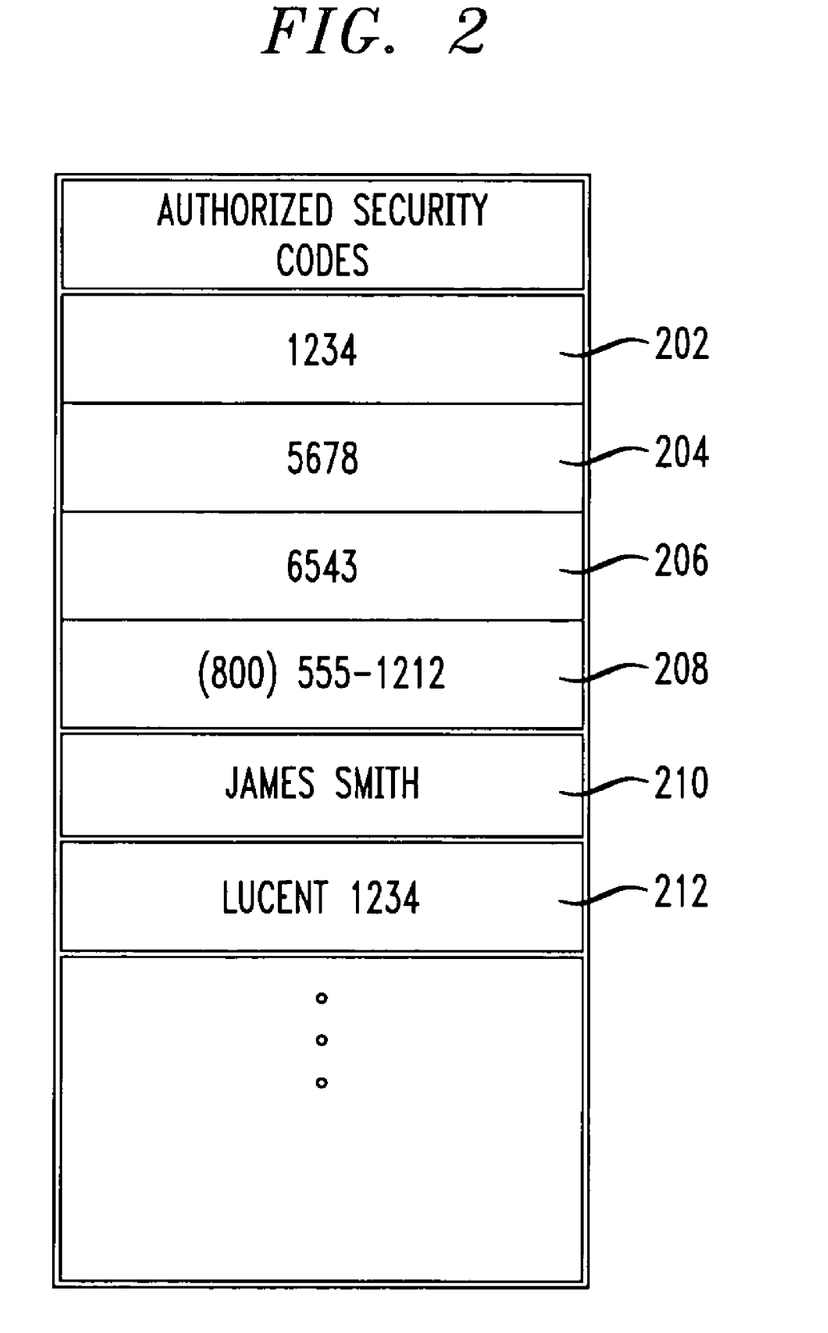
FIG. 2 illustrates an exemplary authorized security code table, in accordance with the principles of the present invention.

FIG. 2 illustrates the contents of an exemplary authorized security code table 34 programmed by the user of the telephone answering device 10 shown in FIG. 1.

In particular, FIG. 2 shows several examples of pre-determined authorized security codes input by the user using the keypad 30 and display 22, with data input prompting by the controller 28 of the telephone answering device 10.

For instance, entries 202–206 illustrate basic numeric security codes which may be used. The security codes may be of any length. While longer security codes typically offer greater security, shorter security codes may be suitable in many applications to prevent unauthorized users access to playback any separately secured voice messages.

Other types of security codes are possible. For instance, entry 208 illustrates the use of a telephone number for comparison with call related information received with respect to an incoming call, while entry 210 illustrates the use of a household name for comparison with received call related information. Entry 212 illustrates the use of a longer security code including alphanumeric characters.

Entries in the authorized security code table 34 are preferably pre-stored by the user of the telephone answering device 10 before reception of a relevant incoming call desiring secured voice message status. For instance, to pre-store an entry into the authorized security code table 34 under the direction of the secured message authorization module 32 in association with the controller 28, the user is be prompted to input an appropriate security code for the current voice message, be it an alphanumeric entry for manual input by the caller, or call related information obtained by the telephone answering device 10 without the caller's intervention and/or even without the caller's knowledge.

Figure 3A:
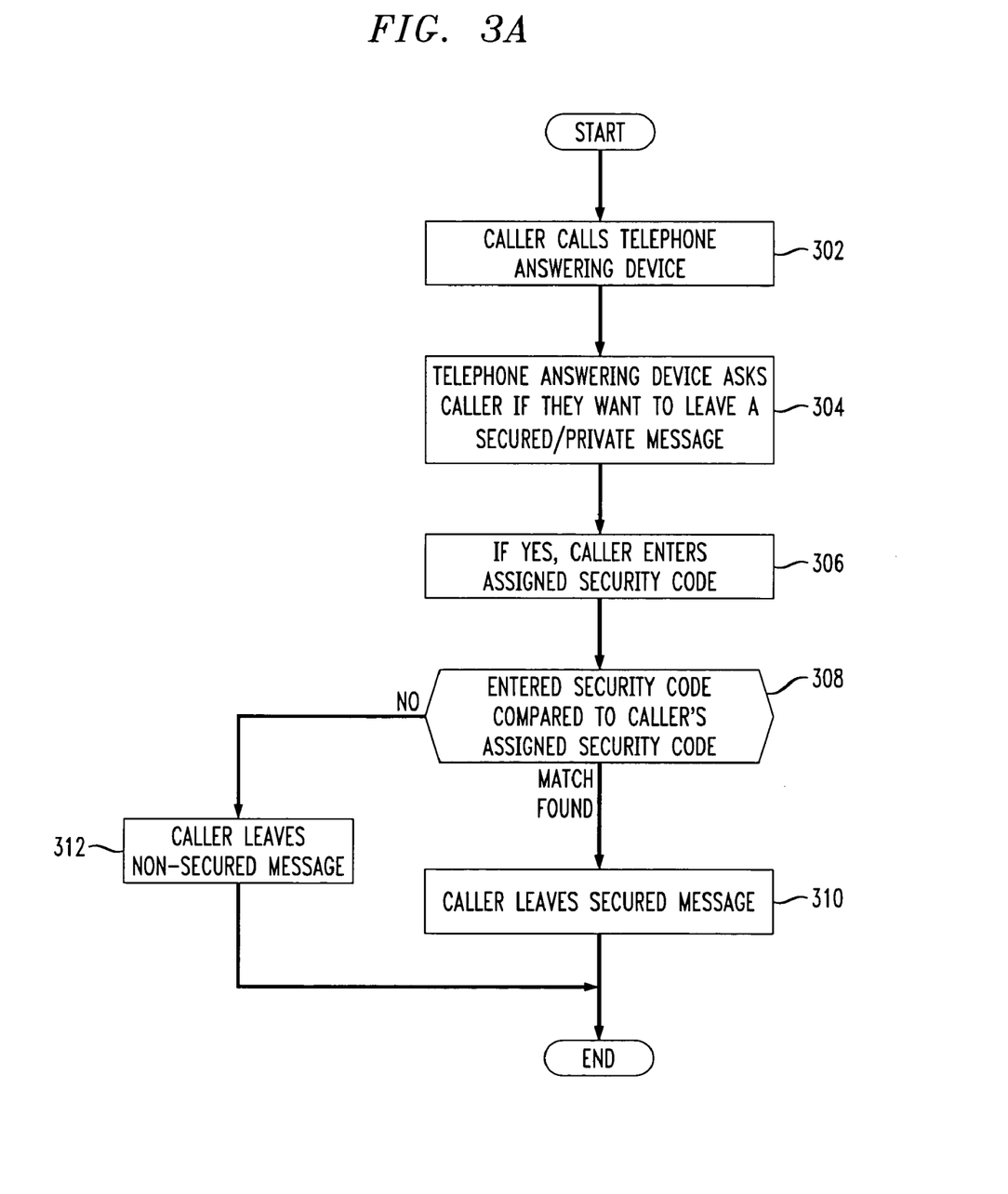
FIG. 3A is a flow chart illustrating an exemplary process by which the telephone answering device of FIG. 1 allows a calling party to leave a separately secured/private voice message on the telephone answering device.
Figure 3B:
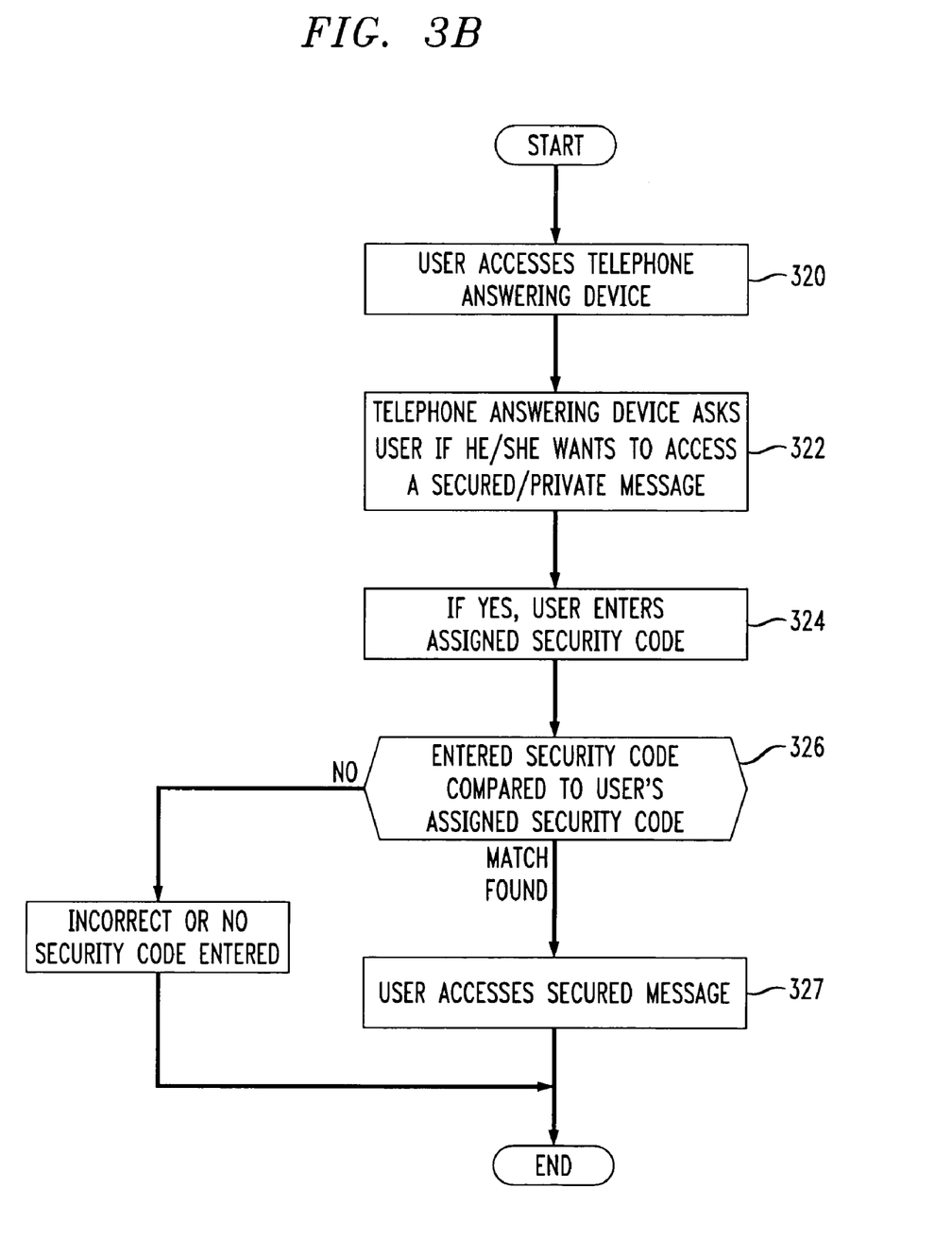
FIG. 3B is a flow chart illustrating an exemplary process by which the telephone answering device of FIG. 1 allows an authorized user to access a separately secured/private voice message stored in the telephone answering device.

FIG. 3A is a flow chart illustrating an exemplary process by which the telephone answering device of FIG. 1 allows a calling party to leave a separately secured/private voice message on a voice messaging system, e.g., a telephone answering device, and FIG. 3B is a flow chart illustrating an exemplary process by which the telephone answering device of FIG. 1 allows an authorized user to access a separately secured/private voice message stored in the telephone answering device.

In particular, FIG. 3A is a flow chart illustrating an exemplary process by which a caller to the telephone answering device 10 of FIG. 1 is allowed to leave a separately secured/private voice message. With reference to FIG. 3A, in step 302, a calling party attempts to call the user at the telephone number of the telephone line 16. After a predetermined number of rings that the telephone line goes unanswered, the telephone answering device 10 answers and plays an appropriate outgoing greeting message, e.g., "I'm not available right now, please leave a message" or other similar greeting.

In step 304, the telephone answering device 10 further prompts the calling party to enter an authorized security code if they want to associate a secured status with their private voice message.

In the disclosed embodiment, the caller may enter the authorized security code either before recording the voice message, or at any time While recording the voice message. Thus, in step 306, if the calling party wishes to record a secured/private voice message on the telephone answering device 10, the calling party enters their assigned authorized security code.

In decision step 308, the controller 28 compares the entered security code to the pre-assigned security code entries in the authorized security code table 34.

If a match is found, in step 310, the telephone answering device 10 associates a separate security status in the header associated with the secured/private voice message in memory.

In step 312, if the calling party enters an incorrect security code, or fails to enter a security code, the telephone answering device 10 stores the voice message in an otherwise conventional fashion, i.e., without associating a secured status in the header information associated with the voice message stored in the voice message memory 23.

FIG. 3B is another flow chart showing an exemplary process by which the telephone answering device 10 of FIG. 1 allows a user to retrieve a separately secured/private voice message stored on the telephone answering device 10.

With reference to FIG. 3A, in step 320, the user accesses the telephone answering device 10 by requesting playback of a particular voice message having a security status associated therewith. It is within the principles of the present invention for the telephone answering device 10 to playback non-secured voice messages in any appropriate order without requesting authorization from a user, but to pause in the playback sequence when a separately secured voice message is encountered.

Separately secured voice messages may be arranged in any accessible order. For instance, the separately secured voice messages may be arranged together for contiguous playback by the secured message authorization module 32 or other function in the controller 28, either before or after the playback of non-secured voice messages.

Preferably, a user or other designated person cannot delete or otherwise dispose of a separately secured voice message without first inputting an appropriate authorization code for that separately secured voice message.

In step 322, the telephone answering device 10 prompts the user to enter an authorized security code to access a separately secured/private voice messages for playback. At this point, the user may determine an appropriate security code by review of the call related information associated with that particular voice message.

In step 324, if the user wishes to access a separately secured/private voice message on the telephone answering device 10, the user enters his or her assigned authorized security code.

In decision step 326, the controller 28 compares the entered security code to the list of pre-assigned security code entries in the authorized security code table 34.

If a match is found in step 326, the telephone answering device 10 plays back the relevant separately secured/private voice message in step 327.

In step 328, if the user enters an incorrect security code or fails to enter a security code, the telephone answering device 10 does not allow access to that particular voice message for which an incorrect security code was entered, but allows playback of non-secured voice messages, and prompts the user for entry of a suitable security code for any subsequent separately secured voice message.

Figure 4:
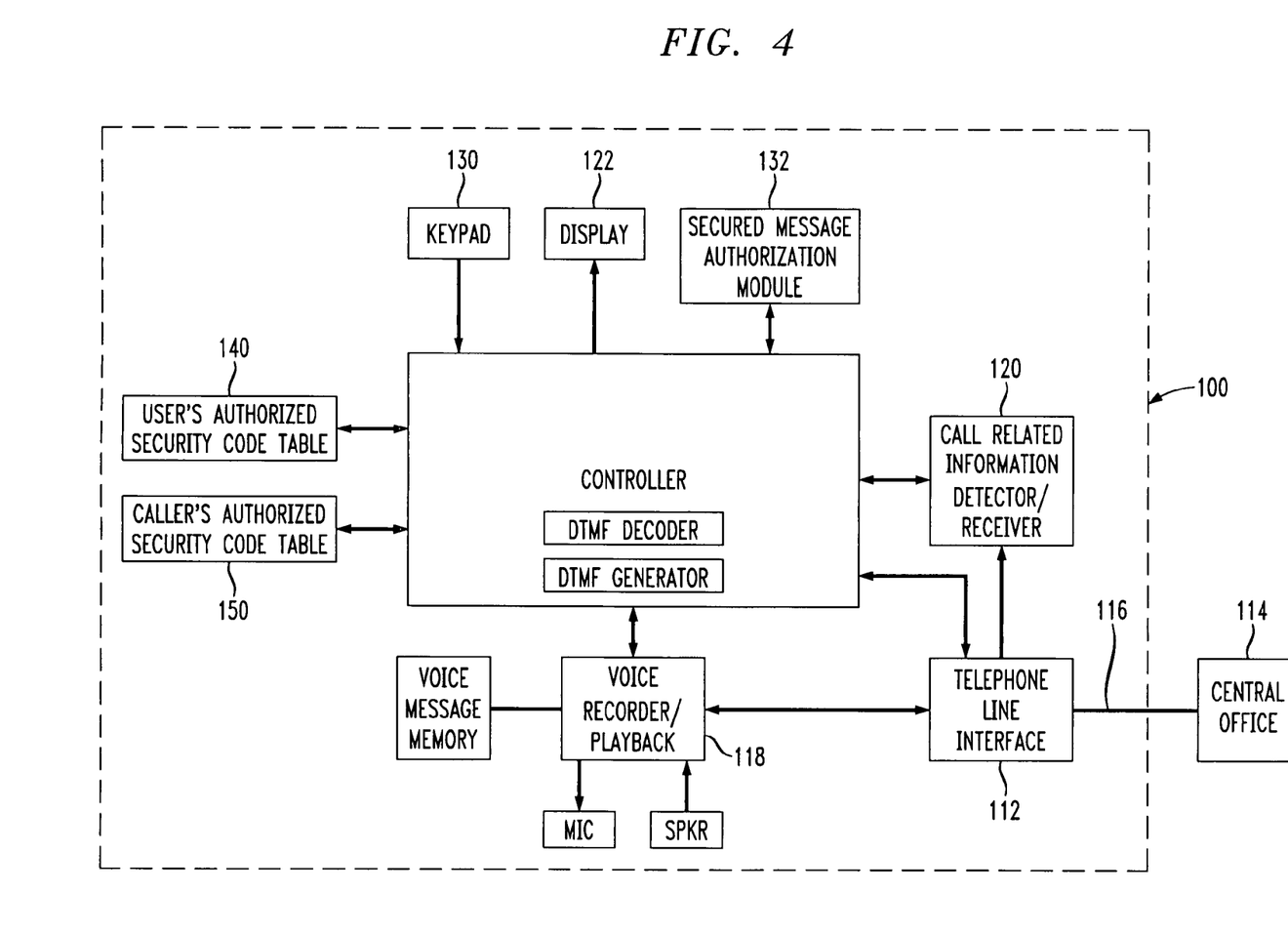
FIG. 4 illustrates another embodiment of a telephone answering device for allowing a caller to record a separately secured/private voice message, and for allowing a particular user or other designated party to access the separately secured/private voice messages, in accordance with the principles of the present invention.

FIG. 4 illustrates another embodiment of a telephone answering device for allowing a caller to record a separately secured/private voice message, and for allowing a particular user or other designated party to access the separately secured/private voice messages, in accordance with the principles of the present invention.

In particular, the telephone answering device 100 shown in FIG. 4 is similar to the telephone answering device 10 shown in FIG. 1, but includes separated tables for authorizing callers and for authorizing users. For instance, the telephone answering device 100 includes a user's authorized security code table 140 and a caller's authorized security code table 150. The user's authorized security code table 140 includes security codes relating to user's and other designated persons having access to separately secured voice messages, and the caller's authorized security code table 150 includes security codes relating to callers who may secure a recorded voice message for access only by those persons who are appropriately authorized.

A more sophisticated security code table may be implemented wherein particular user authorization codes are related to certain callers, either by mapping call related information with the user authorization codes, by mapping callers authorization codes with authorized user security codes, or similar technique.

Figure 5:
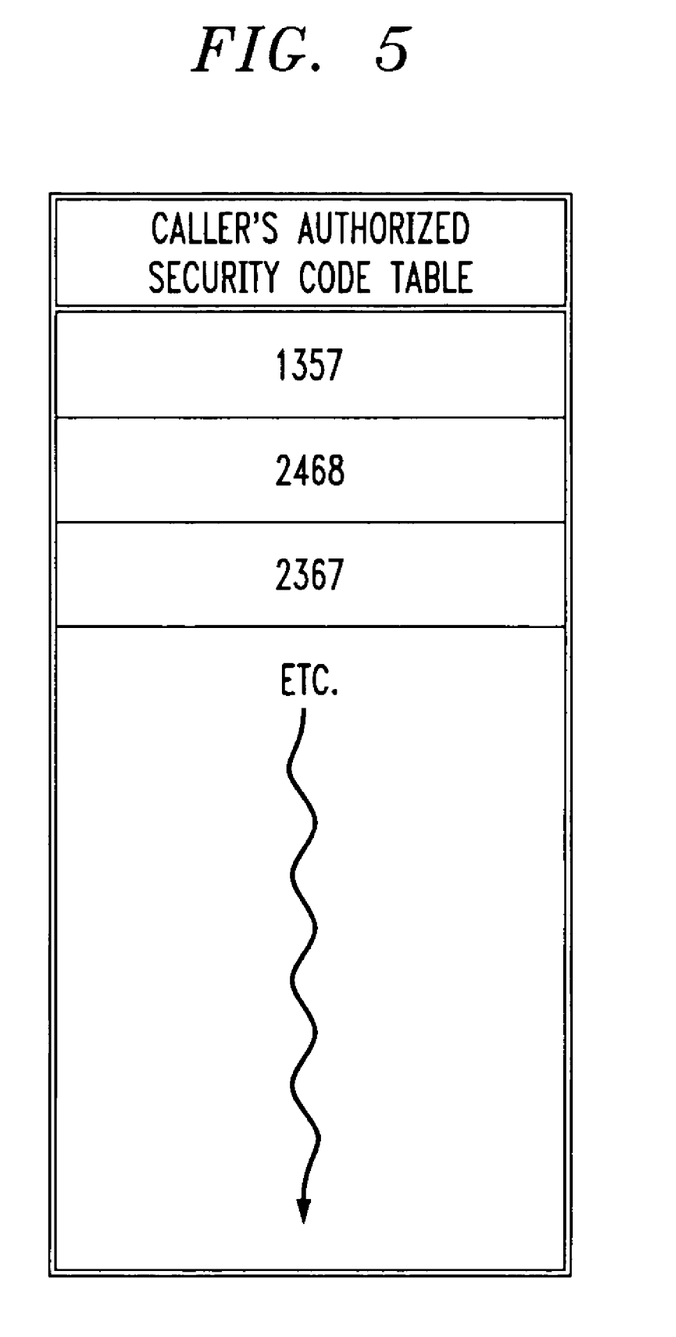
FIG. 5 illustrates an exemplary caller's authorized security code table, in accordance with the principles of the present invention.

FIG. 5 illustrates exemplary entries in a simple caller's authorized security code table 150 shown in FIG. 4.

In particular, the caller's authorized security code table 150 may be pre-stored by the user either before using the telephone answering device 100, or while using the telephone answering device 100, e.g., by 'accepting' call related information relating to a current call for entry into the caller's authorization security code table 150. For instance, to pre-store entries in the caller's authorized security code table 150, the user can be prompted by an appropriate application program running in the controller 128 to associate particular Caller ID information, e.g., a telephone number, name, etc., with the authority to secure a voice message.

Figure 6:
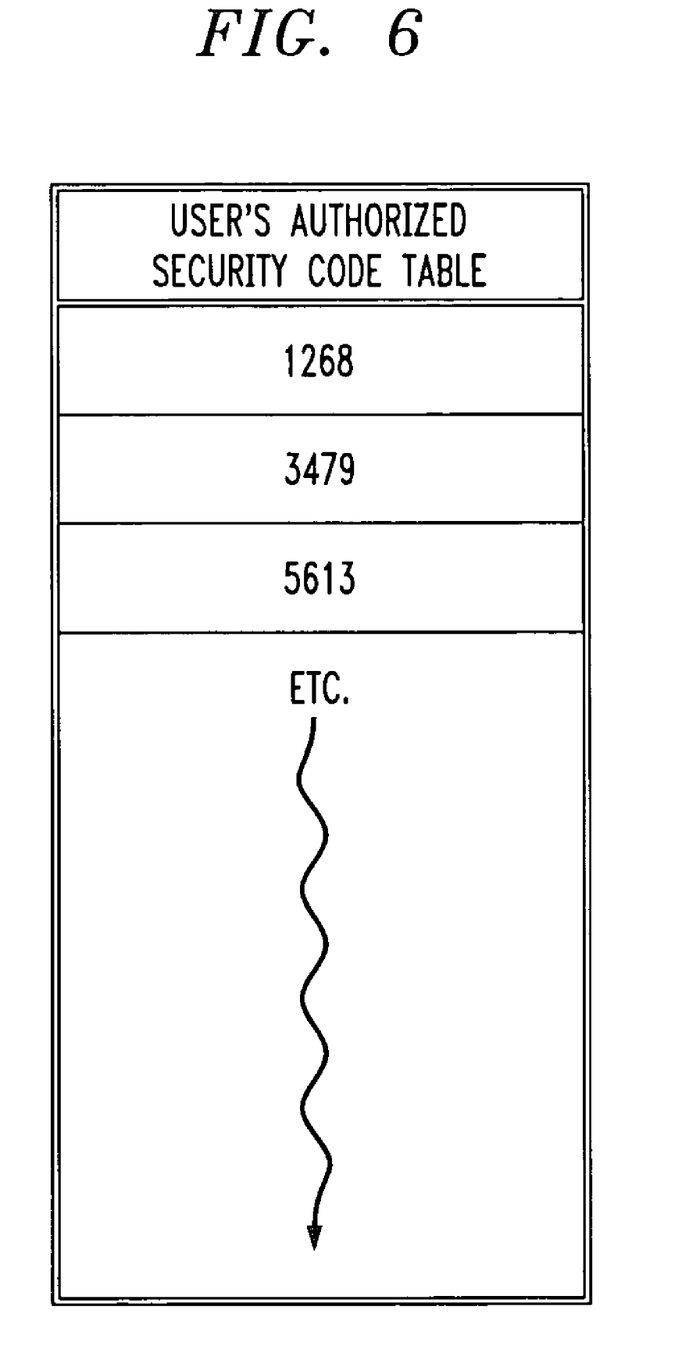
FIG. 6 illustrates an exemplary user's authorized security code table, in accordance with the principles of the present invention.

FIG. 6 illustrates exemplary entries in a user's authorized security code table 140 pre-stored by the user, manufacturer, or other designated entity, for allowing the user to play separately secured/private voice message.

Entries in the user's authorized security code table 140 of FIG. 6 can be pre-stored by the user of the telephone answering device 10. For instance, to pre-store entries in the user's authorized security code table 140, the user can be prompted by an appropriate application program running in the controller 128 to enter the user's authorized security code via the keypad 130.

It should be noted that each calling party and each user can be assigned their own security codes, or groups of calling parties and/or users may share security codes. The security codes for one calling party, one user, or any number of calling parties and users can be updated, e.g., such as adding, deleting, or changing the authorized security codes, frequently by the user of the telephone answering device 10, e.g., by entering the security codes into the authorized security code table using the keypad 30 or other input port. The principles of the present invention work with as few as only one security code, or with many, many security codes.

While the invention has been described with reference to the exemplary embodiments thereof, those skilled in the art will be able to make various modifications to the described embodiments of the invention without departing from the true spirit and scope of the invention.

What is claimed is:

1. A telephone answering device, comprising:
   a telephone line interface;
   a controller;
   a pre-stored Caller ID information memory to pre-store Caller ID information associated with a party calling said telephone answering device that is authorized to leave a secure message on said telephone answering device;
   voice message memory adapted to store a plurality of voice messages; and
   a secured message authorization module adapted to allow said party calling said telephone answering device to secure a voice message upon said Caller ID information associated with said party calling said telephone answering device matching said pre-stored Caller ID information;
   wherein said securing is performed by associating a security status with said voice message before said voice message is fully recorded.

2. The telephone answering device according to claim 1, further comprising:

a playback/recorder module adapted to record said voice message.

3. The telephone answering device according to claim 1, further comprising:
an authorized security code table including information relating to an ability of said calling party to separately secure said voice message.

4. The telephone answering device according to claim 3, wherein:
said authorized security code table further includes at least one security code allowing at least one telephone answering device user access to said separately secured voice message.

5. The telephone answering device according to claim 3, wherein:
said authorized security code table is adapted to include call related information relating to at least one calling party authorized to secure a voice message.

6. The telephone answering device according to claim 1, wherein:
said secured message authorization module is adapted to allow said calling party to secure a voice message upon entry by said calling party of an authorized security code corresponding to a given one of said plurality of telephone answering device users.

7. The telephone answering device according to claim 1, wherein:
said secured message authorization module is adapted to allow said calling party to secure a voice message upon matching of call related information relating to said calling party to at least one pre-stored entry of call related information regarding an ability to secure a voice message.

8. The telephone answering device according to claim 1, wherein:
each of said plurality of voice messages stored in said voice message memory includes header information, said header information including a secure status of said voice message.

9. The telephone answering device according to claim 1, further comprising:
a call related information detector/receiver adapted to detect and receive call related information regarding said calling party.

10. The telephone answering device according to claim 1, wherein:
said controller is adapted to compare call related information received regarding said calling party with at least one pre-stored authorized security code to allow said calling party to separately secure said voice message.

11. A method for securing a voice message in a single mailbox of a telephone answering device, comprising:
downloading Caller ID information associated with a party calling said telephone answering device;
comparing said Caller ID information to at least one pre-stored Caller ID information; and
upon matching said Caller ID information with said pre-stored Caller ID information, securing said voice message for access by at least one telephone answering device user authorized to play back said voice messages;
wherein said securing is performed by associating a security status with said voice message before said voice message is fully recorded.

12. The method for securing a voice message in a single mailbox of a telephone answering device according to claim 11, wherein:
said securing is performed after said voice message is recorded.

13. The method for securing a voice message in a single mailbox of a telephone answering device according to claim 11, further comprising:
entering said authorized security code from a telephone being used by said calling party.

14. A method for securing a voice message in a single mailbox of a telephone answering device, comprising:
downloading Caller ID information associated with a party calling said telephone answering device;
comparing said Caller ID information to at least one pre-stored Caller ID information; and
upon matching said Caller ID information with said pre-stored Caller ID information, securing said voice message for access by at least one telephone answering device user authorized to play back said voice message;
wherein said securing is performed by associating a security status with said voice message while said voice message is being recorded.

15. A method for securing a voice message in a single mailbox of a telephone answering device, comprising:
downloading Caller ID information associated with a party calling said telephone answering device;
comparing said Caller ID information to at least one pre-stored Caller ID information; and
upon matching said Caller ID information with said pre-stored Caller ID information, securing said voice message for access by at least one telephone answering device user authorized to play back said voice message;
wherein said securing is performed by associating a security status with said voice message before said voice message is recorded.

16. Apparatus for securing a voice message in a single mailbox of a telephone answering device, comprising:
means for downloading Caller ID information associated with a party calling said telephone answering device;
means for comparing said Caller ID information to at least one pre-stored Caller ID information; and
means for securing in said voice message for access by at least one telephone answering device user authorized to play back said voice message upon matching said Caller ID information with said pre-stored Caller ID information;
wherein said securing is performed by associating a security status with said voice message before said voice message is fully recorded.

17. The apparatus for securing a voice message in a single mailbox of a telephone answering device according to claim 16, wherein:
said means for securing secures said voice message after said voice message is recorded.

18. The apparatus for securing a voice message in a single mailbox of a telephone answering device according to claim 16, further comprising:
means for entering said authorized security code from a telephone being used by said calling party.

19. Apparatus for securing a voice message in a single mailbox of a telephone answering device, comprising:
means for downloading Caller ID information associated with a party calling said telephone answering device;
means for comparing said Caller ID information to at least one pre-stored Caller ID information; and means for securing in said voice message for access by at least one telephone answering device user authorized to play back said voice message upon matching said Caller ID information with said pre-stored Caller ID information;

wherein said means for securing secures said voice message by associating a security status with said voice message while said voice message is being recorded.

20. Apparatus for securing a voice message in a single mailbox of a telephone answering device, comprising:

means for downloading Caller ID information associated with a party calling said telephone answering device;

means for comparing said Caller ID information to at least one pre-stored Caller ID information; and means for securing in said voice message for access by at least one telephone answering device user authorized to play back said voice message upon matching said Caller ID information with said pre-stored Caller ID information;

wherein said means for securing secures said voice message by associating a security status with said voice message before said voice message is recorded.

* * * * *